United States Patent [19]

Price

[11] 4,032,749
[45] June 28, 1977

[54] FRYING APPARATUS WITH COMPENSATED THERMOSTAT

[75] Inventor: George M. Price, Shreveport, La.

[73] Assignee: The Frymaster Corporation, Shreveport, La.

[22] Filed: Aug. 8, 1975

[21] Appl. No.: 603,009

Related U.S. Application Data

[62] Division of Ser. No. 465,918, May 1, 1974, Pat. No. 3,911,250.

[52] U.S. Cl. .................................. 219/442; 99/337; 99/411; 219/437; 219/511
[51] Int. Cl.² ........................................ F27D 11/02
[58] Field of Search ............ 99/326, 337, 403, 404, 99/408, 411; 219/404, 435, 436, 437, 439, 441, 442, 480, 450, 511; 165/48; 126/374

[56] References Cited

UNITED STATES PATENTS

| 2,668,898 | 2/1954 | Von Behren | 219/404 |
| 2,694,770 | 11/1954 | Sullivan | 219/441 |
| 2,805,314 | 9/1957 | Michallis | 219/437 |
| 2,816,203 | 12/1957 | Wells | 219/489 |
| 2,818,487 | 12/1957 | Kropp, Jr. | 219/441 |
| 2,847,554 | 8/1958 | Huffman | 219/442 |
| 3,118,044 | 1/1964 | Holtkamp | 219/450 |
| 3,231,717 | 1/1966 | Moorhead | 219/441 |
| 3,242,849 | 3/1966 | Wells | 99/411 |
| 3,667,374 | 6/1972 | Holmes | 99/408 |
| 3,720,155 | 3/1973 | Fritzsche | 99/337 |

*Primary Examiner*—Volodymyr Y. Mayewsky
*Attorney, Agent, or Firm*—Hubbard, Thurman, Turner & Tucker

[57] ABSTRACT

A frying apparatus includes a frypot for containing cooking oil positioned in a support housing. Heating elements are pivotally attached to said housing and suspended within the frypot to heat the cooking oil for deep fat frying. A thermostat is mounted to the front of the housing to extend into the frypot above the heating elements to regulate the cooking oil temperature. The thermostat is separate from the heating elements so that the elements may be pivoted upward to a cleaning position. A biasing heater is mounted to the front of housing directly below the thermostat to compensate for the distance between the thermostat and the heating elements by providing additional heat to the thermostat. A temperature selector is provided on the outside front of the housing to allow adjustment of the thermostat without reaching over the frypot.

5 Claims, 6 Drawing Figures

FRYING APPARATUS WITH COMPENSATED THERMOSTAT

This is a division of application Ser. No. 465,918, filed May 1, 1974, now U.S. Pat. No. 3,911,250.

BACKGROUND AND SUMMARY OF THE INVENTION

This invention relates generally to frying apparatus and more particularly to a thermostat system with biasing heater for temperature regulation of frying apparatus.

Frying apparatus, such as a deep fat frying system, usually includes a frypot for containing cooking oil with heating coils mounted on the rear wall of the structure and suspended in the oil. A bulb thermostat is normally attached to the heating coils with a capillary tube extending upward to the control unit. The heating coils are sometimes pivotally mounted to swing upward and rearward to facilitate cleaning of the coils and frypot. This arrangement requires that the control unit for the coils and thermostat be placed on the rear wall so that the coils may be raised without bending the capillary tube. Consequently, an operator must reach across a hot frypot to adjust the thermostat controls.

Some systems have provided a remote control switch on the front wall of the frying apparatus electrically connected to a motor unit which controls a thermostat on the rear wall. Such a system requires additional equipment and servicing for the remote control feature. Moreover, accurate adjustment by remote means is often more difficult and time-consuming than normal manual adjustment.

The present invention provides an operating thermostat mounted on the front wall of frying apparatus and extending into the frypot above the heating coils for controlling the cooking temperature. This approach allows the use of a differential expansion type thermostat which is much more sensitive and accurate than the hydraulic bulb type required if the thermostat is attached to the heating elements. The thermostat is separate from the heating coils to allow the coils to be pivoted upward for cleaning without moving the thermostat. The thermostat and heater controls are mounted on the front of the apparatus to allow adjustment of the controls without reaching across the frypot.

In accordance with one aspect of the invention, a frying apparatus is provided with heating elements in a cooking basin to heat fluid for deep fat frying. Thermal control means are provided in the basin separate from the heating elements for regulating the fluid temperature. Heating means adjacent the thermal control means simulate the temperature of the main heater elements to the thermal control means, compensating for the distance separating the thermal control means from the main heating elements by establishing gravity circulation at the same rate as the main elements.

In accordance with another aspect of the invention, a deep fat frying system includes a frypot for containing cooking oil and heating coils pivotally mounted to rotate upward. A thermostat is mounted separate from the heating coils and in electrical communicaton with the coils to maintain the cooking oil at a predetermined temperature by switching the coils. A biasing heater adjacent the thermostat provides additional heat to simulate the temperature of the cooking oil contiguous to the coils.

BRIEF DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENT

Figures 1, 2:
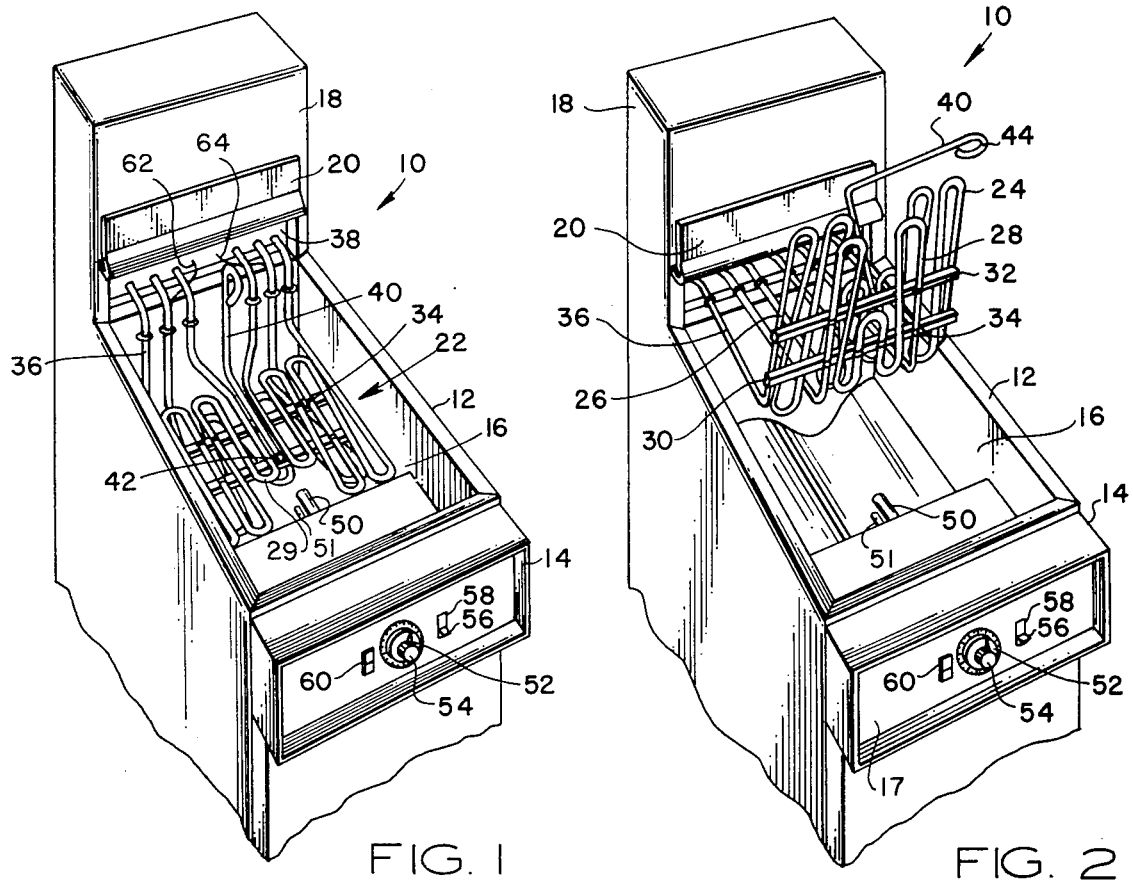
FIG. 1 is a top perspective view of a frying apparatus incorporating a preferred embodiment of the present invention.
FIG. 2 is a top perspective view of a frying apparatus of FIG. 1 with the heater coils in raised position.

Referring now to FIGS. 1 and 2, a frying apparatus 10 includes a rigid housing structure 12 supporting a front panel 14. A cooking basin 16 is provided in the top of housing structure 12 behind front panel 14 for containing cooking fluid normally used in deep fat frying. A back panel 18 extends vertically above the rear of cooking basin 16. A suspension plate 20 is connected to extend horizontally across back panel 18 just above cooking basin 16. Plate 20 is positioned to suspend wire mesh cooking baskets (not shown) over cooking fluid in basin 16.

A plurality of heating elements 22 are suspended horizontally near the bottom of cooking basin 16. Elements 22 include two upper coils 24 and 26 and a lower coil 28. Each coil is mounted on two cross bar pieces 30 and 32 by metal straps 34. A pair of connecting rods 36 are integral with each coil and extend vertically up the back of cooking basin 16 to attach to a pivot piece 38 at the base of back panel 18. An L-shaped level arm 40 extends vertically down the back of cooking basin 16 and then horizontally to pivotally connect to one of cross bars 32 at pivot point 42. A loop 44 is provided at the top of lever arm 40 for pulling the arm 40 to tilt heating elements 22 upward out of basin 16 as shown in FIG. 2.

An operating thermostat 50 is mounted on an inner sloping wall 15 of front panel 14 and extends horizontally into the lower front portion of cooking basin 16. Thermostat 50 is mounted entirely separate from heating elements 22 for independent movement of elements 22. Thermostat 50 is preferably a differential expansion-type, as shown in FIGS. 3 and 4 for use with a biasing heater as will be described.

A temperature selector dial 52 is mounted on the outer front wall 17 of front panel 14 for selecting the desired temperature for the operating thermostat 50. A heater light 54 is provided at the center of selector dial 52 to indicate the on-off status of the heating elements 22. A main on-off switch 56 is positioned on front wall 17 on the right side of selector dial 52 and is provided with a main indicator light 58 therein. A high limit light 60 is mounted on front wall 17 on the left side of selector dial 52 to indicate shut down of heater elements 22 because of excessive temperatures.

Figure 3:
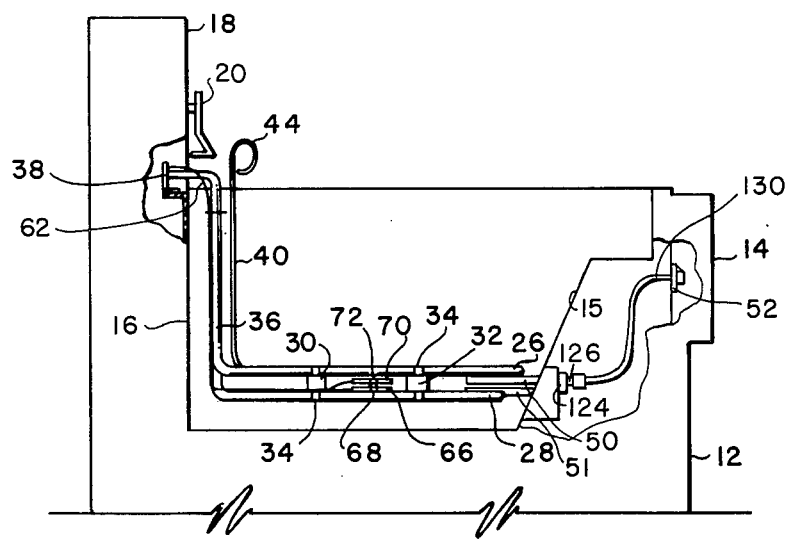
FIG. 3 is a partial elevational view of the frying apparatus of FIG. 1.
Figure 4:
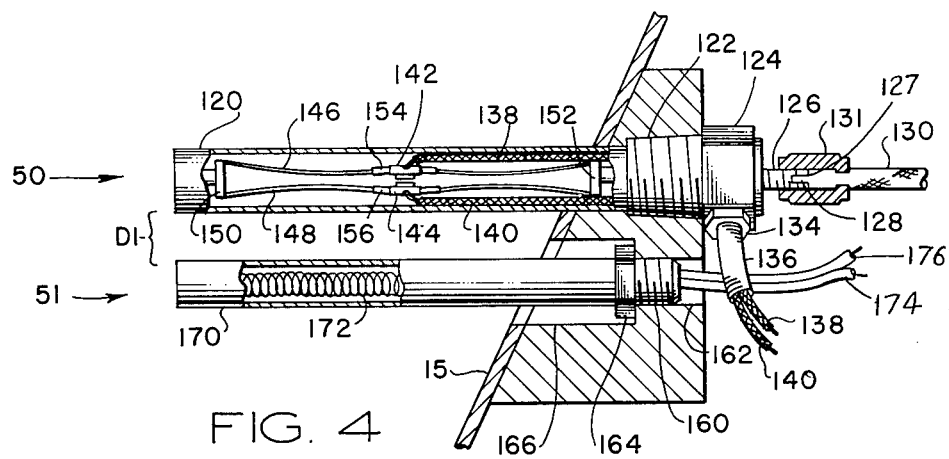
FIG. 4 is a side, partially cut-away view of the thermostat and heater of FIG. 3.

As shown in FIG. 3, two high limit thermostats 66 and 70 are mounted on lower coil 28 by metal straps 68 and 72. Capillary tubes 62 and 64 extend down the backside of two of connecting rods 36 from back panel 18 to the high limit thermostats 66 and 70. The structure and operation of the high limit thermostat system is more fully shown and described in U.S. Pat. No. 3,870,859 issued on Mar. 11, 1975.

Thermostat 50 extends into cooking basin 16 in approximately the same plane as the heating elements 22 with the top of the thermostat about ¼ inch below upper coils 24 and 26. With reference to FIGS. 1 and 2, the center coils 29 of heating elements 22 directly below thermostat 50 are not as long as the rest of the coils, thereby allowing elements 22 to be pivoted to a vertical position without disturbing thermostat 50. A biasing heater 51 is provided below thermostat 50 to compensate for the distance between thermostat 50 and heating elements 22 by establishing gravity flow of cooking fluid to thermostat 50 at or about the same rate as would be established if thermostat 50 were connected to heating elements 22. Heater 51 is spaced a predetermined distance from the thermostat 50 and has thermal characteristics similar to heating elements 22 to simulate to thermostat 50 the temperature and gravity flow of the cooking oil contiguous to heating elements 22. A reset shaft 126 projects longitudinally from a hexagonal nut member 124 on thermostat 50. A flexible cable 130 connects reset shaft 126 to selector dial 52 on front panel 14.

Figure 5:
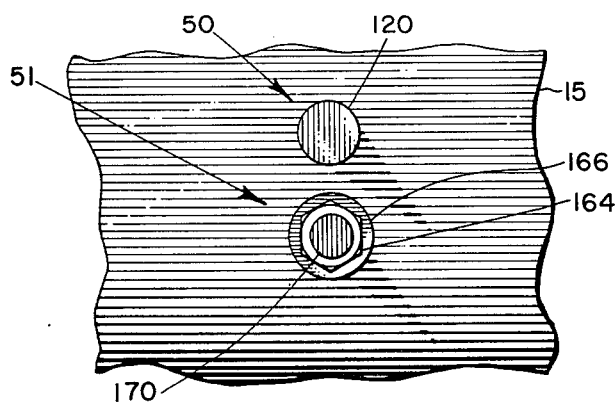
FIG. 5 is an end view of the thermostat and heater of FIG. 4.

Referring to FIGS. 4 and 5, thermostat 50 and biasing heater 51 are shown in greater detail. Thermostat 50 is preferably a differential expansion-type thermostat comprising a cylindrical tube 120 connected at one end by a threaded cylinder 122 to nut member 124.

Reset shaft 126 extends longitudinally from the center of nut member 124 away from tube 120. Reset shaft 126 is threaded, and has a notch 128 extending transversely across the end 127 furthest from nut member 124. Flexible cable 130 is attached to shaft 126 by connector 131 and extends to selector dial 52 mounted on front panel 14.

A lock nut 134 is attached to one hexagonal face of nut member 124 and is provided with a coil spring 136 projecting from the center of nut 134. Two insulated conductors 138 and 140 project through the center of lock nut 134 and coil spring 136 for connection to control circuitry 78 shown in FIG. 6. The other ends of conductors 138 and 140 extend inside cylindrical tube 120, each conductor connecting to one of a pair of diametrically opposed contact points 142 and 144. Points 142 and 144 are each suspended on metallic strips 146 and 148 extending substantially the length of the cylindrical tube 120. Strips 146 and 148 are held by mounts 150 and 152 located at either end of tube 120. Contact points 142 and 144 are insulated from metallic strips 146 and 148 by plastic insulating sheaths 154 and 156 overlying strips 146 and 148.

Biasing heater 51 is mounted below thermostat 50 in the inner front wall 15 of front panel 14. A threaded shaft 160 is screwed into a bore 162 in the inner front wall 15. A nut 164 is concentrically mounted on threaded shaft 160 and tightened into a recess 166 in the front wall 15 in order to hold biasing heater 51 securely in place. Heater 51 comprises a cylindrical tube 170 extending horizontally into the interior of cooking basin 16 below thermostat 50. A heating element 172 extends substantially the entire length of biasing heater 51 and is connected to control circuitry 78 by insulated conductors 174 and 176. Heating element 172 has thermal characteristics, such as watt density and thermal mass per unit length, similar to the main heating elements 22 in order to simulate the dynamic response of elements 22. The distance D1 between biasing heater 51 and thermostat 50, and the material and structure used in the heater are precisely determined in order to accurately follow the temperature of heating elements 22 with a minimum of overshoot or "stepping up" as is often seen with heavy biasing, and to insure rapid response to temperature changes.

Figure 6:
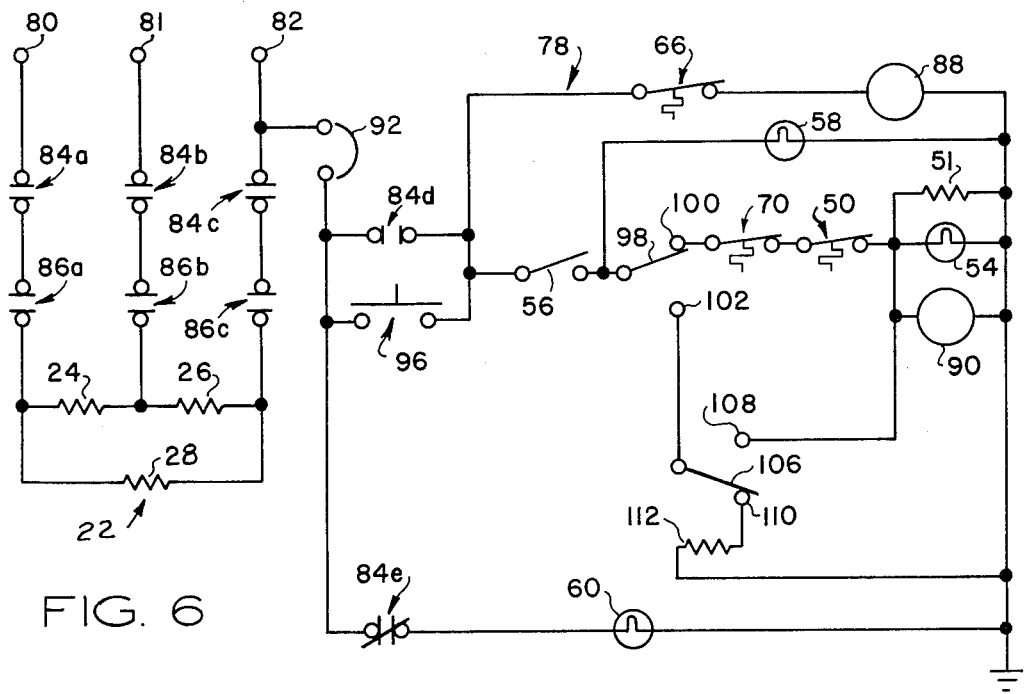
FIG. 6 is a schematic diagram of the control circuitry for the frying apparatus of FIG. 1.

FIG. 6 discloses the electrical circuitry 78 employed for automatically regulating and limiting the cooking and cleaning processes using apparatus 10. Electrical inputs 80, 81 and 82 are connected through a contactor having contacts 84a, 84b, 84c, 84d, and a reverse contact 84e, and a contactor having contacts 86a, 86b and 86c, to heating elements 22 comprising upper coils 24 and 26 and lower coil 28. A contactor coil 88 is positioned to activate contacts 84a, 84b, 84c, 84d, and 84e, and a contactor coil 90 activates contacts 86a, 86b, and 86c. A circuit breaker 92 is connected between input line 82 and circuitry 78 to prevent damage from overloading. The other side of circuit breaker 92 is connected in parallel to contact 84d and a reset switch 96. An on-off switch 56 is provided at the output of contact 84d and switch 96. Main indicator light 58 is connected between the on-off switch 56 and neutral. High limit thermostat 66 is also connected between reset switch 96 and neutral through contactor coil 88.

The other side of on-off switch 56 is connected to a two-way function switch 98 having an upward position with post 100 for a cooking function and a downward position in contact with post 102 for a cleaning function. Connected to post 100 in series are high limit thermostat 70 and operating thermostat 50. On the other side of thermostat 50, connected in parallel, are biasing heater 51, heater light 54, and contactor coil 90. Connected to post 102 of function switch 98 is a two-way delay relay switch 106 having an upward burn-off position when in contact with a post 108 and a downward delay position when in contact with post 110. Connected to post 110 is a heater resistor 112 which operates in association with delay relay switch 106. Heater resistor 112 is in turn connected to neutral. Reverse contact 84e of contactor 84 is connected between circuit breaker 92 and neutral through high-limit light 60 and closes when thermostat 66 or 70 open contact 84 because of a high temperature condition.

In operation, power is impressed on control circuit 78 through inputs 80, 81 and 82. Circuit breaker 92 is normally closed. When reset switch 96 is depressed, contactor coil 88 is activated to close contacts 84a, 84b, 84c and 84d and to open reverse contact 84e. A circuit is maintained through high limit thermostat 66 by contact 84d which will continue to hold until interrupted by a power loss or a high temperature condition opening thermostat 66. The frying apparatus 10 is placed in operation by closing on-off switch 56. Selector dial 52 is turned to choose the desired cooking temperature to be maintained by thermostat 50. With heating elements 22 positioned in the cooking basin 16, switch 98 is in the upward cooking position in contact with post 100. By activating switch 56, contactor coil 90 is energized, which closes contacts 86a, 86b, and 86c and supplies power to heating elements 22. Biasing heater 51 and thermostats 70 and 50 are also actuated. As heating elements 22 warm the cooking oil, biasing heater 51, together with elements 22, provides heat to operating thermostat 50 to simulate the temperature of the cooking oil in the immediate vicinity of elements 22. As thermostat 50 becomes warmer, the cylindrical tube 120 expands, causing the distance between mounts 150 and 152 to increase slightly. When the preselected cooking temperature has been reached, the cylindrical tube 120 has expanded sufficiently to separate contact points 142 and 144, thereby opening thermostat 50. Contactor coil 90 is de-activated, opening contacts 86a, 86b, and 86c and cutting off power to heater elements 22 and to biasing heater 51. As the cooking oil cools below the preselected temperature, thermostat 50 cools accordingly and points 142 and 144 come back into contact. Heater elements 22 and biasing heater 51 are thereby energized and the process is repeated.

The operation of the circuitry with respect to high limit thermostats 66 and 70 does not comprise a part of the invention for the purpose of this patent application, and it is discussed in U.S. Pat. No. 3,870,859, issued Mar. 11, 1975.

It should be understood that other types of thermostats may be used without departing from the spirit of the invention. For example, a bulb-type thermostat utilizing capillary tubing may be mounted on the front of the frying apparatus in place of the thermostat shown. The differential expansion type thermostat is preferable because it offers extremely sensitive control and rapid response to changes. Moreover, this type of thermostat is relatively inexpensive and sturdy compared to some other more fragile types. Likewise, other types of thermal biasing means may be used besides the cartridge-type biasing heater shown, without departing from the spirit of the invention.

It is understood from the foregoing description that the compensated thermostat system of the present invention provides several important advantages over other systems. The thermostat is mounted separately from the heating coils to allow the coils to be pivoted upward without moving or risking damage to the operating thermostat. Moreover, the thermostat and heater controls are mounted on the front panel of the frying apparatus so that an operator may adjust the controls without reaching over a hot frypot during cooking and without coming near the hot coils during pyrolytic cleaning. A biasing heater is provided below the operating thermostat to compensate for the separation between the thermostat and heating coils and insures accurate operation of the thermostat.

Although a particular embodiment of the invention has been illustrated in the accompanying drawings and described in the foregoing detailed description, it will be understood that the invention is not limited to the embodiment disclosed, but is capable of rearrangement, modification and substitution without departing from the spirit of the invention.

What is claimed is:

1. In a deep fat frying system having a frypot for containing cooking oil and electrically operated heating coils in said frypot pivotally attached to said housing to rotate upward to a cleaning position, thermal control apparatus for regulating the temperature of said heating coils comprising:
    an electrical thermostat mounted separate from said heating coils and in electrical communication with said coils for maintaining said cooking oil at a predetermined temperature by alternately switching said coils off and on, and
    an electrical biasing heater in electrical communication with said heating coils and mounted adjacent said thermostat for heating said thermostat when said coils are switched on to simulate to said thermostat the temperature of said cooking oil contiguous to said coils.

2. The apparatus of claim 1 wherein said thermostat is mounted on the front of said frypot a fixed distance above said heating coils.

3. The apparatus of claim 2 wherein said biasing heater is mounted on the front of said frypot below said thermostat and wherein said biasing heater supplies sufficient heat to said thermostat to effectively compensate for said fixed distance between thermostat and said coils to thereby simulate to said thermostat the temperature of said cooking oil contiguous to said coils.

4. The apparatus of claim 1 wherein said biasing heater is electrically connected to said thermostat and said coils and is switched off and on with said coils by said thermostat.

5. The apparatus of claim 1 wherein said heating coils may be rotated upward to said cleaning position without moving said thermostat.

* * * * *